O. D. W. INMAN.
MOLD.
APPLICATION FILED MAY 25, 1909.
952,525.
Patented Mar. 22, 1910.
2 SHEETS—SHEET 1.
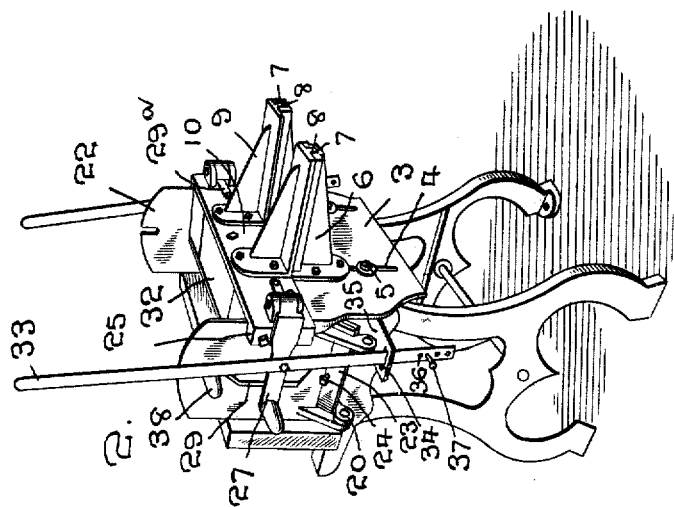
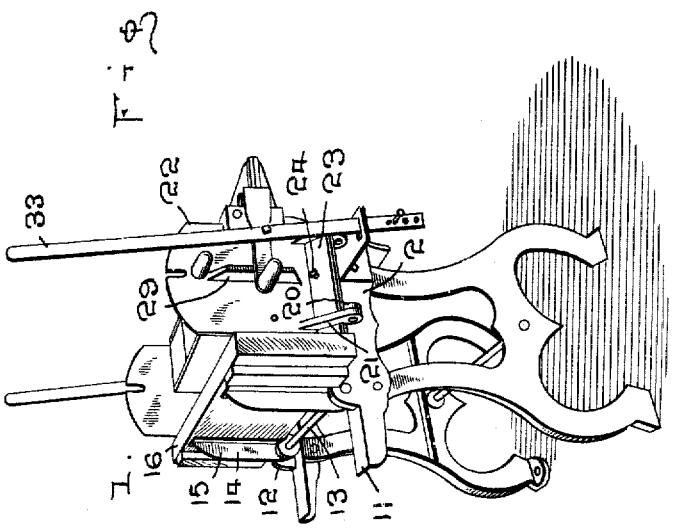
WITNESSES:
Thos. W. Riley
M. A. Newcomb
INVENTOR
O. D. W. Inman
BY
W. J. FitzGerald
Attorneys O. D. W. INMAN.
MOLD.
APPLICATION FILED MAY 25, 1909.
952,525.
Patented Mar. 22, 1910.
2 SHEETS—SHEET 2.
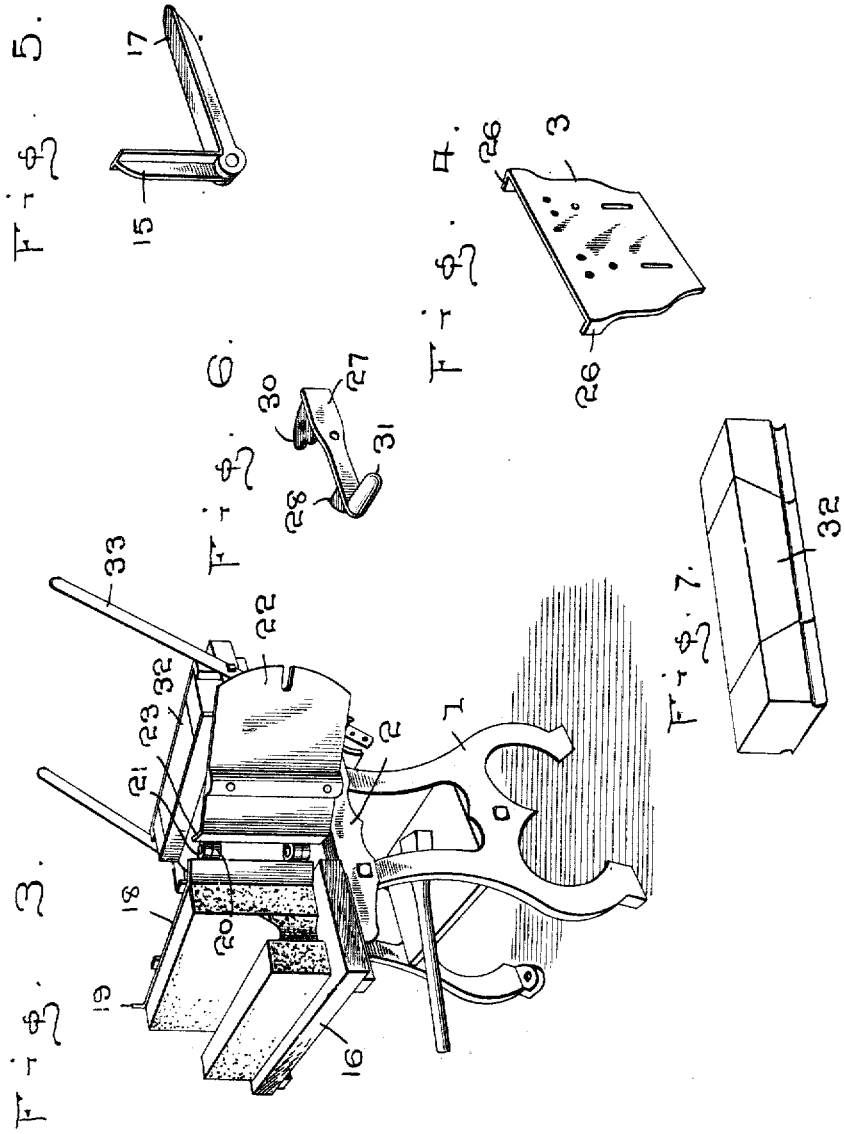
WITNESSES:
INVENTOR
O. D. W. Inman
BY
W. J. FitzGerald
Attorneys

UNITED STATES PATENT OFFICE.

ORION D. W. INMAN, OF JANESVILLE, WISCONSIN.

MOLD.

952,525.  Specification of Letters Patent.  Patented Mar. 22, 1910.

Application filed May 25, 1909.  Serial No. 498,269.

*To all whom it may concern:*

Be it known that I, ORION D. W. INMAN, a citizen of the United States, residing at Janesville, in the county of Rock and State of Wisconsin, have invented certain new and useful Improvements in Molds; and I do hereby declare the following to be a full, clear, and exact description of the invention, such as will enable others skilled in the art to which it appertains to make and use the same.

My invention relates to new and useful improvements in molds and more particularly to that class adapted to be used for molding blocks of plastic material and my object is to provide means for readily assembling the parts of the mold to receive the plastic material.

A further object is to provide suitable cores whereby overhanging portions may be formed on the blocks and a further object is to provide means for adjusting parts of the mold whereby blocks of different heights may be formed.

Other objects and advantages will be hereinafter referred to and more particularly pointed out in the claims.

In the accompanying drawings forming part of this application, Figure 1 is a perspective view of the machine showing a front view thereof. Fig. 2 is a perspective view of the machine taken from a different angle. Fig. 3 is also a perspective view of the machine showing the manner of removing the molded block. Fig. 4 is a detail perspective view of the adjustable back plate for the mold. Fig. 5 is a detail perspective view of the supporting means for the face plate and core. Fig. 6 is a detail perspective view of a latch employed for holding the parts of the mold in assembled position, and, Fig. 7 is a detail perspective view of a core employed in connection with the mold.

Referring to the drawings in which similar reference numerals designate corresponding parts throughout the several views, 1 indicates standards, which are constructed in the usual or any preferred form, having at their upper ends a platform 2, to the rear edge of which is adjustably secured a back plate 3, said back plate having vertically extending slots 4 therein, through which take bolts 5 and by which means the plate is locked in its adjusted position on the platform.

Secured to the rear face of the back plate 3 are brackets 6, having channels 7 therein, with which engage tongues 8 and slide bars 9, said slide bars being attached to a core plate 10, which is adapted to normally rest over the upper edge of the plate 3, but slides rearwardly on the brackets 6 when the block is to be removed from the mold.

Extending forwardly from the platform 2 are rest bars 11, said bars having upstanding ears 12 adjacent their connection with the platform 2, through which extends a rod 13, said rod having pivotally mounted thereon supporting bars 14, one set of the arms 15 of the supporting bars being adapted to engage and support a pallet 16, while the opposite arms 17 of the supporting bars are adapted to receive and support a face plate 18 and by extending the arms 15 and 17 at right angles to each other, the pallet will rest in a horizontal position and upon the rest bars 11, when the face plate is in a vertical position. The ends 19 of the face plate 18 are extended at an angle of substantially 45 degrees to the trend of the face plate and are provided with hinges 20 with which are engaged hinges 21 on the end doors 22, the lower ends 23 being likewise disposed at an angle of substantially 45 degrees to coöperate with the ends 19 of the face plate and by extending an adjusting bolt 24 through the end walls 23 and in position to engage the ends 19, the doors 22 may be readily adjusted to extend in a vertical position when the mold is in its assembled position.

The core plate 10 is provided at its ends with shoulders 25 and the ends of the back plate 3 with tongues 26, which are adapted to extend over the outer faces of the end doors 22 and hold said doors against outward swinging movement, while the mold is being filled and it will be readily seen that by manipulating the adjusting bolt 24, the end doors may be forced firmly into engagement with the tongues and shoulders.

When the mold is in its assembled position and the core plate moved over the back plate 3, said core plate is held in position by hingedly securing to the ends of the core plate, latches 27, said latches having tongues 28 thereon which are adapted to extend over and engage ribs 29 on the outer faces of the doors 22, said latches being normally held in engagement with the ribs by means of tension springs 29ª, one end of which is fixed to the core plate and the opposite end engaged with a projection 30 on the hinged end of the latches, the free ends of the latches having handles 31 thereon, whereby they may be manually disengaged from the ribs.

The core plate 10 is adapted to receive a core 32, which is preferably formed in various shaped sections which may be employed for forming corners, angle blocks, etc., said sections being removably secured to the core plate and the core plate and core attached thereto are moved back and forth over the brackets 6 by means of levers 33, the lower ends of the levers being extended through slots 34 formed in extensions 35 on the platform 2, the lower ends of the levers having openings 36 therein into which is to be introduced a pin 37, which pin prevents the levers from leaving the slots and by pivotally attaching the levers to the latches 27, and so constructing the slots 34 as to permit lateral swinging movement of the levers, the latches may be disengaged from the ribs 29 by swinging the levers laterally and the core plate and core attached thereto, moved rearwardly by swinging the levers rearwardly and vice versa when the levers are swung in the opposite direction.

In operation, the face plate 18 is swung over the platform 2 and the doors 22 raised to a vertical position and engaged with the tongues 26 on the back plate 3, this operation raising the pallet 16 to a vertical position. A sufficient quantity of the substance of which the block is made, is then tamped into the lower portion of the mold or until the top of the back plate is reached and after being smoothed, the core plate and core are moved forwardly through the medium of the levers 33 and disposed over that portion of the block within the mold and after the latches have been engaged with the ribs on the doors, the remaining portion of the mold is filled, when the latches are disengaged from the ribs and the core plate and core thereon moved rearward and from over the mold. The handles 38 on the doors 22 are then grasped and the supporting bars 14 rotated on the rod 13, which will dispose the pallet on the rest bars 11 when the end doors 22 may be swung open and the completed block removed from the machine by lifting the pallet from the rest bars. A new pallet is then placed in position and the mold again placed in its assembled position and the molding operation repeated and by forming the various projections and contours on the core 32, it will be readily seen that the blocks may be molded in various shapes and at a minimum expense and amount of labor. And it will likewise be seen that the various parts of the mold may be readily adjusted to engage the core with the block at various heights and in view of the adjustability of the doors and other parts of the mold, a perfect block may be produced.

What I claim is:

1. In a mold of the class described, the combination with a platform having rest bars thereon and means to support the platform of a back plate adjustably secured to the platform, brackets attached to said back plate, a core plate having slide bars adapted to engage said brackets and move thereover, a removable core attached to the core plate, a face plate having angular extensions at its ends, doors each having its lower end also deflected at an angle, said angular extensions and angular lower end portions of said doors forming the hinging points of connection therebetween, means of adjustment applied to said angular extensions, said coreplate and said back-plate being provided with interengaging shoulders and tongues, respectively, a pallet coöperating with said face plate and means to hold the core in position in the mold.

2. In a mold of the class described, the combination with a platform having rests thereon; of a back plate adjustably mounted on the platform and having tongues thereon, a core plate movably mounted over the back plate and provided with shoulders, a core carried by said plate, means to move the core plate and core laterally, a face plate, a pallet coöperating therewith, means to support said face plate and pallet, doors hingedly secured to the face plate and adapted to engage said tongues when in a closed position said face plate and said doors having opposed angular portions and means applied to said angular portions and adapted to force said doors into engagement with said shoulders and tongues.

3. In a mold, the combination with a platform, supporting bars pivotally mounted thereon, an adjustably mounted back plate and a movable core above said back plate; of a face plate carried by said supporting bars, the ends of which are disposed at an angle to the trend of the face plate, doors hingedly secured to said end sections of the face plate and having their lower ends deflected at a like angle as the angular extensions of the said face-plate, means applied to said angular extensions and said lower angular ends to force said doors into effective position, ribs on the doors and means carried by the core plate adapted to engage said ribs and hold the core in position in the mold.

4. In a mold, the combination with a frame, supporting bars carried by the frame, a face plate and pallet carried by the supporting bars, doors hingedly secured to the face plate, a movably mounted core plate and a core carried by said core plate; of latches hingedly secured to the ends of the core plate and having means thereon adapted to engage said doors and hold the core in position in the mold, means to hold the latches in engagement with the doors and additional means to move said core plate forwardly and rearwardly.

In testimony whereof I have signed my name to this specification in the presence of two subscribing witnesses.

ORION D. W. INMAN.

Witnesses:
 MAGGIE C. SMITH,
 JENNIE L. BURKE.